J. L. ROUTIN.
SUPPORT FOR AIMING DEVICES, TELEMETERS, AND OTHER APPLICATIONS.
APPLICATION FILED MAY 3, 1918.

1,312,000.

Patented Aug. 5, 1919.
2 SHEETS—SHEET 1.

UNITED STATES PATENT OFFICE.

JOSEPH LOUIS ROUTIN, OF PARIS, FRANCE.

SUPPORT FOR AIMING DEVICES, TELEMETERS, AND OTHER APPLICATIONS.

1,312,000.

Specification of Letters Patent. Patented Aug. 5, 1919.

Application filed May 3, 1918. Serial No. 232,353.

*To all whom it may concern:*

Be it known that I, JOSEPH LOUIS ROUTIN, a citizen of the French Republic, and a resident of 2 Rue Olchanski, Paris, France, have invented a new and useful Improvement in Supports for Aiming Devices, Telemeters, and other Applications, which invention is fully set forth in the following specification.

The subject of the present invention is a support for aiming devices, telemeters, altimeters and other applications.

The new support is more particularly constructed so that it can be quickly installed on any locality of a field of battle. It is characterized by being composed for this purpose of a lower element which can be anchored in the ground independently of an upper element forming the support properly so called, to which it serves as base and which includes feet of regulatable length, elastic connections being hooked by their upper end to each of these feet and by their lower end to the base.

According to a particularly practical form of construction of the invention, the base which is independently anchored in the ground and on which are hooked the elastic connections of fixture of the support properly so called, is composed of a plurality of posts, the heads of which are provided with collars presenting a groove with which hooks can engage; the support properly so called is composed of a tripod the legs of which form at their lower end screw threaded sockets for receiving the regulating screws which in their turn are provided at their lower ends with a rotatable foot plate with toothed or knurled base by which they can grip the corresponding post-head of the base.

The tripod head includes, a simple device for use in orienting the apparatus supported thereby, so that the apparatus may be given a predetermined direction, or for the determination of this setting in relation to a given direction.

The annexed drawing illustrates, as an example, this form of construction of the invention.

Figure 1:
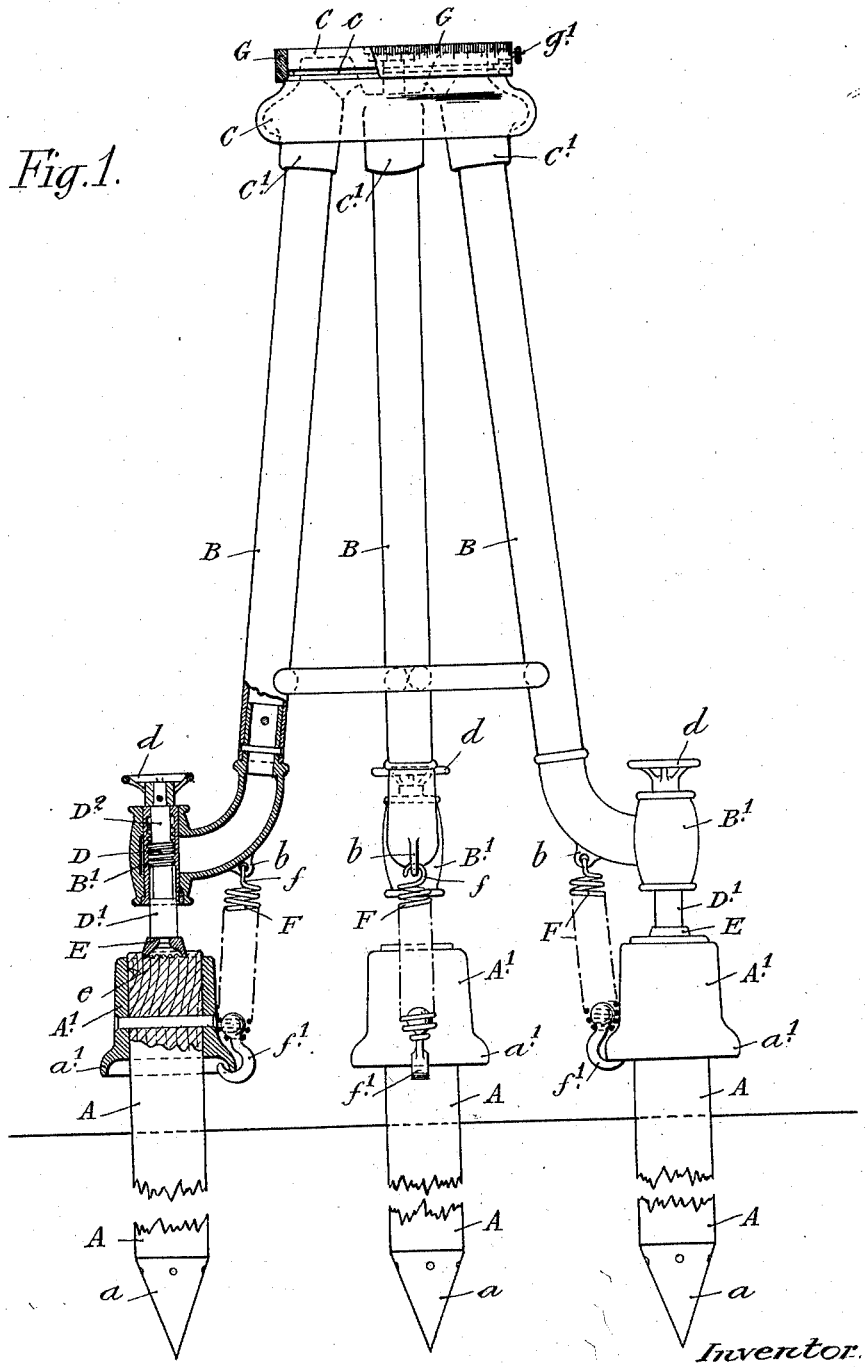
Figure 1 is an elevation of the complete support, partly in section.
Figure 2:
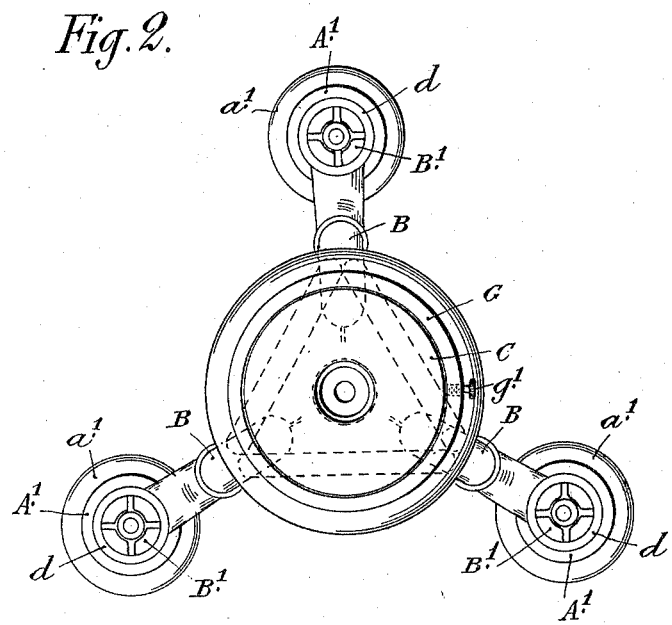
Fig. 2 is a plan thereof.
Figure 3:
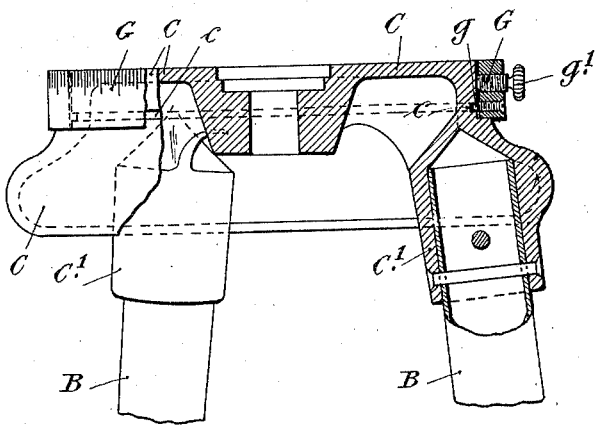
Fig. 3 is a partial section, on a larger scale, of the upper part of the support properly so called.

The base or lower element of the support includes three posts A of wood, furnished at their lower ends with metal spikes $a$ so that they may be readily sunk in the ground. The head of each of the posts is incased in a metal collar $A^1$ presenting a circular lower or lateral flange $a^1$ for the hooking of the elastic fixing connection of the corresponding foot of the support proper.

In order to receive the latter the posts are sunk in at the desired distance apart. The said support includes three feet B formed, for instance, of steel tubes suitably braced and connected at their upper ends in sockets $C^1$ formed under a head platform C.

At the lower end of each of the feet is a screw threaded socket $B^1$ in which the screw threaded portion D of a bearing or jack screw $D^1 D^2$ engages with a view to regulating the horizontality of the support. The jack screw $D^1 D^2$ can be displaced, by working a flywheel $d$. The jack screw $D^1 D^2$ carries at its lower end a rundle or rotary foot E which is provided with claws or teeth $e$ enabling it to grip the head of the corresponding post. The screw thread D is preferably formed exclusively on a middle part of the rod, between the two smooth parts $D^1$, $D^2$ of the latter which are turned to the diameter of two corresponding smooth parts of the nut: thus any introduction of dust or mud into the screw-threading is prevented.

The elastic connections by which the support proper is attached to the base-forming posts may be composed of spiral springs F hooking by means of end hooks $f$, $f^1$ respectively to a lug $b$ of the support foot and to the rim $a^1$ of the collar $A^1$ of the corresponding post A.

The posts A having been sunk at the desired distance apart and to the desired depth, for the convenient mounting of the tripod, the screws D should first be loosened so as to facilitate the engaging of the hooks $f^1$ under the rims $a^1$ of the collars $A^1$. The screws are then actuated in order to obtain in the first place a suitable strain on the springs. The screws are then further regulated, so that the upper surface of the plate C may be truly horizontal. This last operation is controlled in the usual way, by the use of a level.

For the setting of the supported apparatus, according to a determined direction, or for the determination of the setting of the apparatus in relation to a given direction, the platform C is surrounded by a graduated ring G, held from detachment by grub screws $g$ engaging in a groove $c$ of the body of the platform; a projecting set screw $g^1$ serves as a handle for use in rotating the ring and also for holding it in any position to which it may be set.

It is seen that the apparatus described fully answers all the conditions for the rapid installation of a support, especially on a battle-field.

Whatever may be the nature of the ground, the separately anchored base, composed, say, of the posts A, provides a stable platform for the support proper.

The elastic connections insure a complete solidarity between the base and the support proper and prevent any accidental upsetting of the latter. The securing of this solidarity in no way reduces the facility of horizontally regulating the tripod head.

Finally the setting of the supported apparatus is easy to determine and to transmit, owing to the reading device on the movable ring G.

I claim:

1. A support for aiming and other devices of precision, comprising a base element consisting of a plurality of posts adapted to be anchored in the ground, an upper element consisting of a platform provided with legs adjustably supported on said posts, and resilient means between said posts and legs for holding the elements in position.

2. A support for aiming and other devices of precision, comprising a base element consisting of a plurality of anchoring posts each provided near its upper end with an annular collar, an upper element consisting of a platform provided with legs adjustably supported on said posts, hooks engaging said collars, and resilient connections between said hooks and legs.

3. A support for aiming and other devices of precision, comprising a base element consisting of a plurality of wooden anchoring posts each provided with an annular collar, an upper element comprising a platform provided with legs having feet provided with leveling screws terminating in bearings having roughened surfaces for gripping the heads of the posts on which they rest, and springs fast to said feet and having hook connections with said collars.

4. In a support of the character defined in claim 1 wherein said legs are provided with feet having sockets, each socket having a central threaded portion and smooth-bore end portions of different diameters and an adjusting element comprising a threaded member having smooth end portions for fitting said sockets to exclude dust or mud.

In testimony whereof I have signed this specification.

JOSEPH LOUIS ROUTIN.

Witnesses:
MARCEL GUILLEMOT,
CHAS. P. PRESSLY.

Copies of this patent may be obtained for five cents each, by addressing the "Commissioner of Patents, Washington, D. C."